(12) United States Patent
Chen et al.

(10) Patent No.: US 12,450,640 B2
(45) Date of Patent: Oct. 21, 2025

(54) METHOD, ELECTRONIC DEVICE AND STORAGE MEDIUM FOR ITEM RECOMMENDATION

(71) Applicant: Beijing Baidu Netcom Science and Technology Co., Ltd., Beijing (CN)

(72) Inventors: Lianghui Chen, Beijing (CN); Yan Fu, Beijing (CN); Quanbin Wang, Beijing (CN); Xiaoxuan Yang, Beijing (CN); Liangang Peng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 1279 days.

(21) Appl. No.: 17/152,562

(22) Filed: Jan. 19, 2021

(65) Prior Publication Data

US 2021/0224879 A1 Jul. 22, 2021

(30) Foreign Application Priority Data

Jan. 22, 2020 (CN) .......................... 202010073347.4

(51) Int. Cl.
*G06Q 30/0601* (2023.01)
*G06F 16/245* (2019.01)
*G06N 20/00* (2019.01)

(52) U.S. Cl.
CPC ....... *G06Q 30/0631* (2013.01); *G06F 16/245* (2019.01); *G06N 20/00* (2019.01)

(58) Field of Classification Search
None
See application file for complete search history.

(56) References Cited

U.S. PATENT DOCUMENTS

2017/0185894 A1 6/2017 Volkovs et al.
2018/0253780 A1 9/2018 Wang et al.
(Continued)

FOREIGN PATENT DOCUMENTS

CN 105654329 A 6/2016
CN 106169150 A 11/2016
(Continued)

OTHER PUBLICATIONS

Rodriguez, Marko A., and Peter Neubauer. "The Graph Traversal Pattern." Graph Data Management, IGI Global, pp. 29-46. Crossref, https://doi.org/10.4018/978-1-61350-053-8.ch002. (Year: 2010).*
(Continued)

*Primary Examiner* — Michelle T Kringen
(74) *Attorney, Agent, or Firm* — Kwan & Olynick LLP

(57) ABSTRACT

A method, electronic device and storage medium for item recommendation and for model training, which relates to the field of artificial intelligence, are disclosed. According to some embodiments: an item feature expression database is created using a pre-trained user-clicking-item task model and at least two pieces of feature information of items in the repository of items to be recommended; a feature expression of a user is obtained using the pre-trained user-clicking-item task model and at least two pieces of feature information of the user; identifiers of N items to be recommended are obtained according to the feature expression of the user and the item feature expression database; relevant information of the N items is recommended to the user based on the identifiers of the N items.

14 Claims, 4 Drawing Sheets

(56) References Cited

U.S. PATENT DOCUMENTS

2020/0380211 A1* 12/2020 Fan .................... G06N 3/08
2021/0027160 A1   1/2021 Volkovs et al.
2021/0248477 A1   8/2021 Cai

FOREIGN PATENT DOCUMENTS

| | | | | |
|---|---|---|---|---|
| CN | 107273438 | A | | 10/2017 |
| CN | 107392644 | A | | 11/2017 |
| CN | 109191196 | A | | 1/2019 |
| CN | 109191240 | A | | 1/2019 |
| CN | 109543066 | A | | 3/2019 |
| CN | 109547814 | A | * 3/2019 ........... H04N 21/233 |
| CN | 109903103 | A | | 6/2019 |
| CN | 109993627 | A | | 7/2019 |
| CN | 110008399 | A | | 7/2019 |
| CN | 110084670 | A | | 8/2019 |
| CN | 110162700 | A | | 8/2019 |
| CN | 110298725 | A | | 10/2019 |
| CN | 110457589 | A | | 11/2019 |
| CN | 110599295 | A | | 12/2019 |
| CN | 110599307 | A | | 12/2019 |
| CN | 110674406 | A | | 1/2020 |
| EP | 3547155 | A1 | | 10/2019 |
| JP | 2016115316 | A | | 6/2016 |
| JP | 2018005662 | A | | 1/2018 |
| JP | 2018063484 | A | | 4/2018 |
| JP | 2018181326 | A | | 11/2018 |
| KR | 20180121466 | A | | 11/2018 |
| KR | 20190111313 | A | | 10/2019 |

OTHER PUBLICATIONS

First Chinese Office action for CN202010073347.4, issued Dec. 23, 2022, 10 pgs.

Hwang Hyun-young, et al., Personalized microblog recommendation that integrates user characteristics and preferences, Mar. 25, 2018, 7 pgs.

Notice of Allowance for Korean Application No. KR10-2021-0008893, issued Nov. 29, 2022, 10 pgs.

Research on Personalized recommendation Technology based on IPTV, Jun. 5, 2017, 9 pgs.

Notice of allowance for CN202010073347.4 issued on Jun. 19, 2023, 4 pgs.

European Search Report for EP App. No. 21152576.1, dated Apr. 1, 2022, 9 pages.

Japanese First Office Action for App. No. JP2021-007184, 2 pages.

* cited by examiner

METHOD, ELECTRONIC DEVICE AND STORAGE MEDIUM FOR ITEM RECOMMENDATION

The present application claims the priority and benefit of Chinese Patent Application No. 202010073347.4, filed on Jan. 22, 2020. The disclosure of the application is incorporated herein by reference in its entirety.

TECHNICAL FIELD

The present disclosure relates to the technical field of computers, and particularly to artificial intelligence, and specifically to a method, electronic device and storage medium for item recommendation and for model training.

BACKGROUND

As the Internet develops to date, various Internet products are derived. For example, emergence of a shopping platform such as E-commerce changes people's living lifestyles and enhances shopping convenience.

SUMMARY

The present disclosure provides a method, electronic device and storage medium for item recommendation and for model training, to improve the accuracy of item recommendation.

In an aspect, the present disclosure provides an item-recommending method, which includes:
  creating an item feature expression database using a pre-trained user-clicking-item task model and at least two pieces of feature information of items in a repository of items to be recommended;
  obtaining a feature expression of a user using the pre-trained user-clicking-item task model and at least two pieces of feature information of the user;
  obtaining identifiers of N items to be recommended, according to the feature expression of the user and the item feature expression database; and
  recommending relevant information of the N items to the user based on the identifiers of the N items.

Further optionally, in the method, the obtaining identifiers of N items to be recommended according to the feature expression of the user and the item feature expression database may include:
  obtaining feature expressions of the N items most relevant to the feature expression of the user by searching from the item feature expression database; and
  obtaining the identifiers of the N items corresponding to the feature expressions of the N items.

Further optionally, in the method, the pre-trained user-clicking-item task model includes a recall task module and a click rate estimation task module, and the recall task module and the click rate estimation task module are trained jointly.

In another aspect, the present disclosure further provides a method for training a user-clicking-item task model, which includes:
  collecting a plurality of pieces of training data, each piece of the training data including at least two pieces of training feature information of a training user, at least two pieces of training feature information of a training item, and click interaction information of the training user clicking the training item;
  performing joint training on a recall task module and a click rate estimation task module in the user-clicking-item task model, by using the plurality of pieces of training data.

Further optionally, in the method, the performing joint training on a recall task module and a click rate estimation task module in the user-clicking-item task model, by using the plurality of pieces of training data includes:
  for each piece of the training data, obtaining a combined feature expression of the training user by splicing the at least two pieces of feature information of the training user after performing embedding expression on them;
  obtaining a combined feature expression of the training item by splicing the at least two pieces of training feature information of the training item after performing embedding expression on them;
  in the recall task module, obtaining the feature expression of the training user and the feature expression of the training item by processing the combined feature expression of the training user and the combined feature expression of the training item respectively through at least two processing layers including layers for full connection processing and activation processing;
  in the recall task module, obtaining a recommendation degree index of the training item to the training user by multiplying the feature expression of the training user with the feature expression of the training item;
  in the click rate estimation task module, obtaining a predicted click probability of the training user clicking the training item by processing in turn through at least two processing layers including layers for full connection processing and activation processing and through a sigmoid activation function processing layer, after splicing the combined feature expression of the training user and the combined feature expression of the training item;
  generating a comprehensive cross-entropy loss function according to the recommendation degree index of the training item to the training user, the predicted click probability of the training user clicking the training item, and the known click interaction information of the training user clicking the training item;
  judging whether the comprehensive cross-entropy loss function converges; adjusting parameters of the user-clicking-item task model in response to determining that the comprehensive cross-entropy loss function does not converge;
  in response to determining that the comprehensive cross-entropy loss function converges, and in response to determining that the comprehensive cross-entropy function converges in all of first continuous preset rounds of training, determining parameters of the user-clicking-item task model, and thereby determining the user-clicking-item task model.

Further optionally, in the method, the generating a comprehensive cross-entropy loss function according to the recommendation degree index of the training item to the training user, the predicted click probability of the training user clicking the training item, and the known click interaction information of the training user clicking the training item includes:
  generating a first cross-entropy function according to the recommendation degree index of the training item to the training user and the known click interaction information of the training user clicking the training item;

generating a second cross-entropy function according to the predicted click probability of the training user clicking the training item and the known click interaction information of the training user clicking the training item; and summating the first cross-entropy function and second cross-entropy function to obtain the comprehensive cross-entropy function.

Further optionally, in the method, in response to determining that the comprehensive cross-entropy function converges in all of the first continuous preset rounds of training, the method further includes: continuing to train the call task module with the plurality of pieces of training data until the first cross-entropy function converges in all of second continuous preset rounds of training, determining parameters of the recall task module, determining the recall task module and thereby determining the user-clicking-item task model.

In a further aspect, the present disclosure further provides an item-recommending system, which includes:
  a creating module configured to create an item feature expression database using a pre-trained user-clicking-item task model and at least two pieces of feature information of items in a repository of items to be recommended;
  a feature obtaining module configured to obtain a feature expression of a user using the pre-trained user-clicking-item task model and at least two pieces of feature information of the user;
  an item-obtaining module configured to obtain identifiers of N items to be recommended according to the feature expression of the user and the item feature expression database; and
  a recommendation module configured to recommend relevant information of the N items to the user based on the identifiers of the N items.

In a further aspect, the present disclosure further provides an apparatus for training a user-clicking-item task model, which includes:
  a collecting module configured to collect a plurality of pieces of training data, each piece of the training data including at least two pieces of training feature information of a training user, at least two pieces of training feature information of a training item, and click interaction information of the training user clicking the training item; and
  a training module configured to perform joint training on a recall task module and a click rate estimation task module in the user-clicking-item task model, by using the plurality of pieces of training data.

In a further aspect, the present disclosure further provides an electronic device, which includes:
  at least one processor; and
  a memory communicatively connected with the at least one processor; where,
  the memory stores instructions executable by the at least one processor, and the instructions are executed by the at least one processor to enable the at least one processor to execute the method according to any of the above aspects.

In a further aspect, the present disclosure further provides a non-transitory computer-readable storage medium including instructions, which, when executed by a computer, cause the computer to carry out the method according to any of the above aspects.

BRIEF DESCRIPTION OF THE DRAWINGS

The figures are intended to facilitate understanding the solutions, not to limit the present disclosure. In the figures.

DETAILED DESCRIPTION OF EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications may be made to the embodiments described herein without departing from the scope and spirit of the application. Also, for the sake of clarity and conciseness, depictions of well-known functions and structures are omitted in the following description.

Among various Internet application products, a user may choose an item of interest, or a system may recommend an item to the user. For example, in a conventional item recommending system, a collaborative filtering recommendation manner may be employed. For example, item-based collaborative filtering recommendation itemCF or user-based collaborative filtering recommendation userCF is often used in the related art. According to itemCF, the number of overlaps of users who are all interested in two items is used to measure the similarity between the two items, and then similar candidate items are recommended according to user's historical items. According to the userCF, the number of overlaps of items of interest for two users is used to measure the similarity between the two users, and then candidate items are recommended to a target user according to items of interest for a group of similar users.

However, when the number of users and/or items is large, the above recommendation solution requires a very large calculation amount and calculation cost, is prone to calculation errors, and causes poor item recommendation accuracy.

Figure 1:
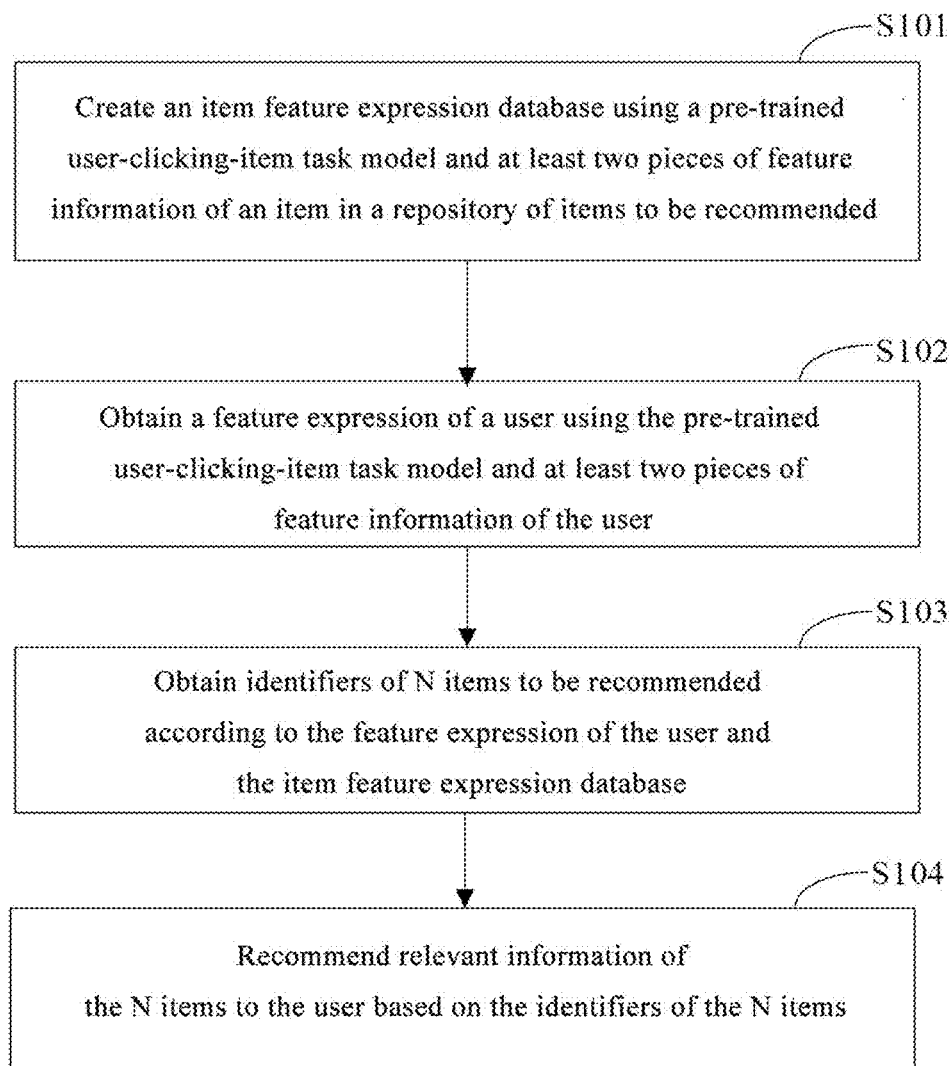
FIG. 1 illustrates a schematic diagram of a first embodiment of the present disclosure.

FIG. 1 illustrates a schematic diagram of a first embodiment of the present disclosure. With reference to FIG. 1, an item-recommending method according to the embodiment may include the following steps:

S101: creating an item feature expression database using a pre-trained user-clicking-item task model and at least two pieces of feature information of items in a repository of items to be recommended;

A subject for executing the item-recommending method according to the embodiment is an item recommendation apparatus which may be an electronic entity; or the subject may be an application integrated with a program and which, upon use, runs on a computer device to implement item recommendation.

The item-recommending method according to the embodiment is implemented based on a pre-trained user-clicking-item task model. The user-clicking-item task model is a neural network model. The neural network model may implement simulation of at least one task of the user clicking the item, for example, a recall task and/or a click rate estimation task, etc. During the simulation of the task of the user clicking the item, it is necessary to perform embedding processing on the user and the item respectively based on the feature information of the user and the feature information of the item, to obtain corresponding feature expressions, and then implement task simulation based on the feature expressions. Hence, feature expression of the item is acquired based on the feature information of the item according to parameters of a duly-trained feature expression in the user-clicking-item task model. The feature expression in the embodiment may take a form of a vector, and may also be referred to as a vector expression. Correspondingly, the item feature expression database may be a FAISS vector index database.

The repository of items to be recommended in the embodiment includes pre-collected information of a plurality of items, for example, the information of each item includes an identifier of the item and at least two pieces of feature information of the item. The identifier of the item is used to uniquely identify the item. For example, the identifier of the item may employ at least one type of a number, a letter and a character or a combination of at least two types. The at least two pieces of feature information of the item may include other information such as a class of the item and a keyword of the item.

In the embodiment, the feature expression of each item may be obtained based on the pre-trained user-clicking-item task model and at least two pieces of feature information of the item in the repository of items to be recommended; and the item feature expression database including the feature expressions of the items in the repository may be further created based on the feature expressions of the items. The item feature expression database may further include the identifier of each item.

The feature expressions in the embodiment all take a form of a vector, and may also be referred to as vector expressions or vectors.

S102: obtaining a feature expression of a user using the pre-trained user-clicking-item task model and the at least two pieces of feature information of the user;

Referring to the embodiment of step S101, the feature expression of the user is obtained based on the user-clicking-item task model and the at least two pieces of feature information of the user. Reference may be made to the depictions of the above step S101 for details, which will not be repeated here.

The at least two pieces of feature information of the user according to the embodiment may include the behavior information of the user, the interest tag of the user, the demographic attributes of the user such as age, sex, life stages etc, which will not detailed here.

S103: obtaining identifiers of N items to be recommended according to the feature expression of the user and the item feature expression database;

Specifically, feature expressions of the N items most relevant to the feature expression of the user may be obtained by searching from the item feature expression database; then, the identifiers of the N items corresponding to the feature expressions of the N items may be obtained.

S104: recommending relevant information of the N items to the user based on the identifiers of the N items.

For example, relevant information such as identifiers, feature information, details or links of the N items may be recommended to the user based on the identifiers of the N items. In the embodiment, the relevant information of the N items recommended to the user is not limited to the above types. In practical applications, the relevant information may further include other information of the N items, which will not be detailed here. Specifically, the relevant information of the N items may be obtained based on the identifiers of the N items according to the application scenario of the technical solution of the embodiment and recommended to the user. For example, in the Internet shopping platform, details or purchasing links of the N items may be obtained based on the identifiers of the N items, and recommended to the user.

It may be understood from the above depictions that the application scenario of the item-recommending method of the embodiment is that when the repository of items to be recommended and the at least two pieces of feature information of the user are already known, recommendation of the relevant information of the N items in the repository of items to the user may be implemented based on the duly-trained user-clicking-item task model.

Optionally, the pre-trained user-clicking-item task model according to the embodiment may include a recall task module and a click rate estimation task module, and the recall task module and the click rate estimation task module are trained jointly.

Figure 2:
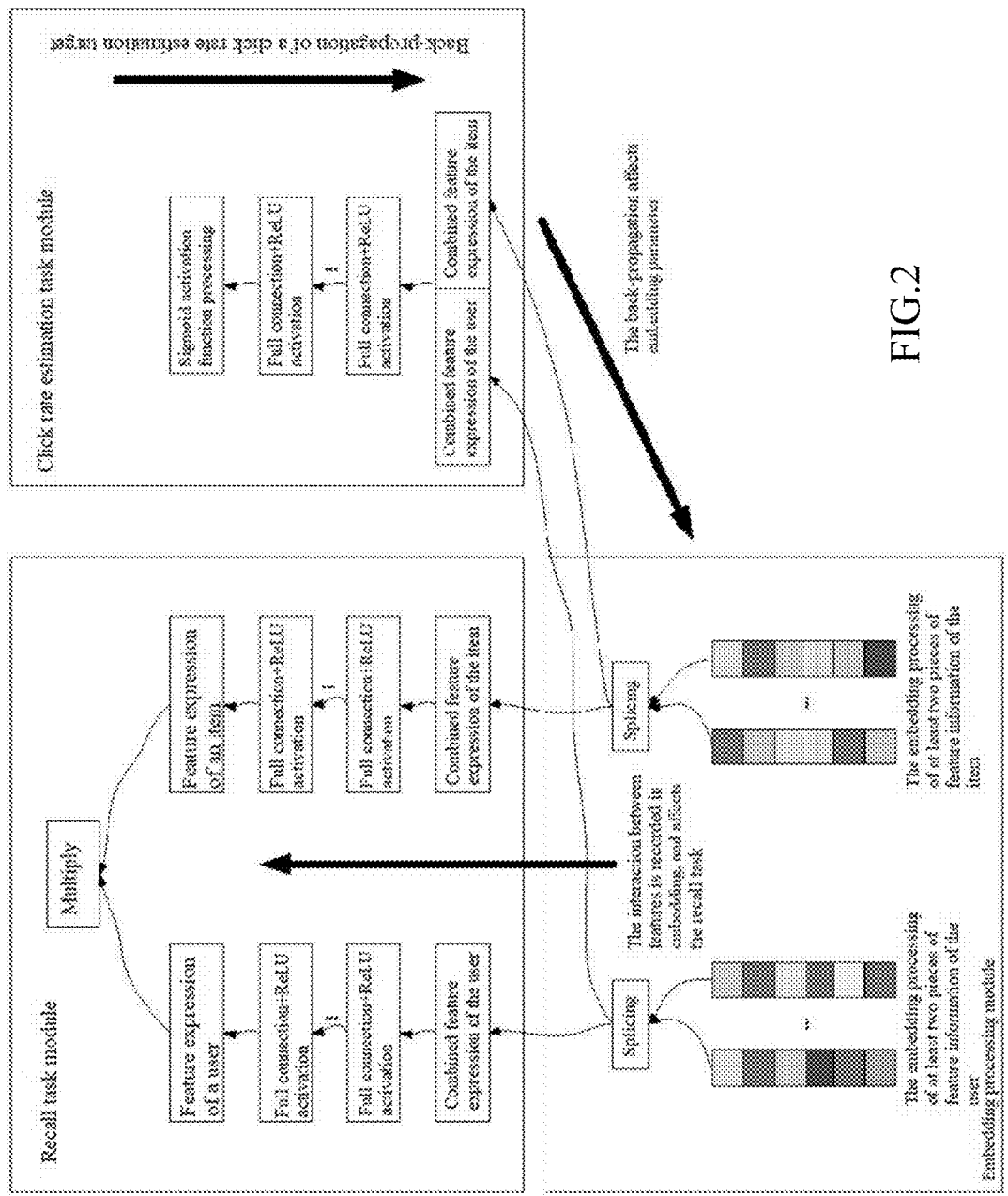
FIG. 2 illustrates a structural diagram of a user-clicking-item task model according to an embodiment.

For example, FIG. 2 illustrates a structural diagram of the user-clicking-item task model according to the embodiment. With reference to FIG. 2, in addition to the recall task module and the click rate estimation task module, the user-clicking-item task model according to the embodiment further includes a basic information processing module, or, an embedding processing module. The embedding processing module performs embedding processing on the at least two pieces of feature information of the user and at least two pieces of feature information of the item, respectively, and then splices them. Both the recall task module and the click rate estimation task module use an expression after the splicing as input for processing.

The recall task module is used to implement calculation of a recommendation degree index of the item to the user. The higher the recommendation degree index is, the larger a probability that the item is recalled when the item is recommended to the user is; on the contrary, the smaller the recommendation degree index is, the smaller the probability that the item is recalled is.

The click rate estimation task module is used to implement prediction of the click rate of the item by the user. The larger the click rate is, the more the user is interested in the item, and the larger the probability of clicking the item is; on the contrary, the smaller the click rate is, the less the user is interested in the item, and the smaller the probability of clicking the item is.

The recall task module and the click rate estimation task module in the user-clicking-item task model according to the embodiment are two independent tasks. In practical applications, the embedding processing module may be combined with the recall task module to form an independent task model to implement the recall task. Alternatively, the embedding processing module may be combined with the click rate estimation task module to form an independent task model to implement the click rate estimation.

For example, in the embodiment, the user-clicking-item task model may include only the embedding processing module and the recall task module without the click rate estimation task module. After the model of the task is trained duly, step S101 and step S102 of the embodiment shown in FIG. 1 may be implemented based on the model of the task.

However, as shown in FIG. 2, in the case that the user-clicking-item task model only includes the embedding processing module and the recall task module, the feature expression of the user and the feature expression of the item do not interact in any way besides they are multiplied upon calculating the recommendation degree index of the item to the user at a top layer. The information at the top layer has already been compressed, and the model lacks feature crossing and interaction between feature expressions at the bottom layer. As a result, when the user-clicking-item task model is trained, the feature expression of the user and the feature expression of the item are completely independent, any crossing information of the user and the item may not be learnt, and the recall effect of the trained model is undesirable.

In the user-clicking-item task model in the embodiment shown in FIG. 2, the click rate estimation task module is introduced. The click rate estimation task module is configured to predict the click rate based on features resulting from splicing the combined feature expression of the user and the combined feature expression of the item, i.e., interact the feature expression of the user with the feature expression of the item. As such, upon training, the click rate estimation task module, by back-propagation, may affect embedding parameters in the embedding processing module so that information of interaction between the feature expression of the user and the feature expression of the item is recorded in the embedding parameters, and thereby may affect the recall task so that the recall effect is made better.

At this time, correspondingly, when step S101 is performed, the feature expressions of items in the repository of items may be obtained based on at least two pieces of feature information of the items in the repository of items, according to network structure parameters in the embedding processing module and recall task module in the duly-trained user-clicking-item task model shown in FIG. 2. Furthermore, the feature expressions of all items in the repository of items may be combined together to create an item feature expression database.

Likewise, when step S102 is performed, the feature expression of the user may be obtained based on the at least two pieces of feature information of the user, according to network structure parameters in the embedding processing module and recall task module in the duly-trained user-clicking-item task model shown in FIG. 2.

It is to be noted that in addition to commodity, the item in the embodiment may also be other information such as advertisement, and recommendation of advertisement or other information may also be implemented in other fields.

According to the item-recommending method of the embodiment, the item feature expression database is created using the pre-trained user-clicking-item task model and at least two pieces of feature information of items in the repository of items to be recommended; the feature expression of a user is obtained using the user-clicking-item task model and at least two pieces of feature information of the user; identifiers of N items to be recommended are obtained according to the feature expression of the user and the item feature expression database; relevant information of the N items is recommended to the user based on the identifiers of the N items. As compared with the prior art, the technical solution of the embodiment achieves item recommendation by the pre-trained user-clicking-item task model, may effectively reduce the calculation amount, avoid calculation errors and improve recommendation accuracy. Furthermore, the technical solution may effectively improve intelligence of item recommendation and enhance item recommendation efficiency.

Furthermore, the recall task model and the click rate estimation task module in the user-clicking-item task model according to the embodiment are two independent tasks, and the feature expression of the user may be made interact with the feature expression of the item in the click rate estimation task module. As such, upon training, the click rate estimation task module, by back-propagation, may affect embedding parameters in the embedding processing module so that information of interaction between the feature expression of the user and the feature expression of the item is recorded in the embedding parameters, and thereby may affect the recall task to make the recall effect better and further effectively improve the item recommendation effect.

Figure 3:
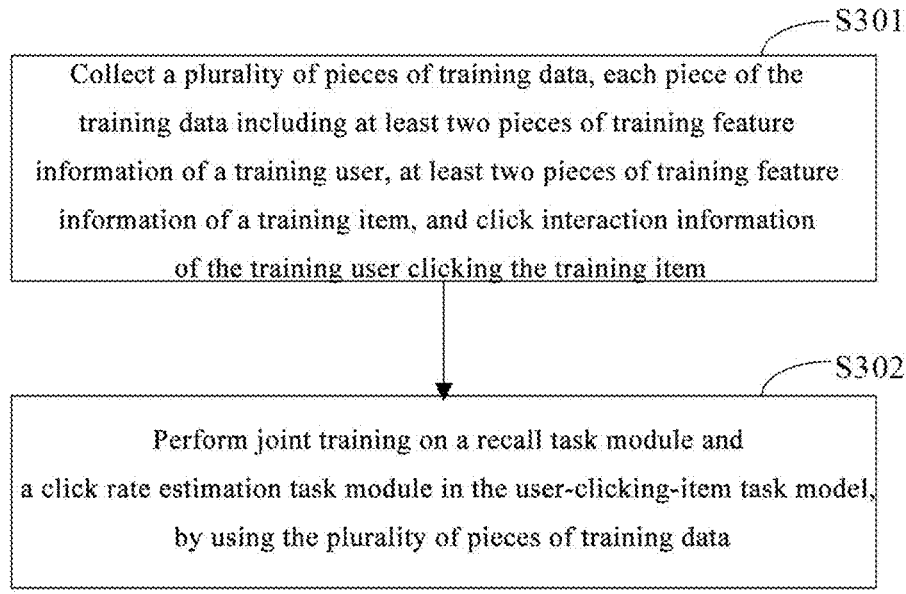
FIG. 3 illustrates a schematic diagram of a second embodiment of the present disclosure.

FIG. 3 illustrates a schematic diagram of a second embodiment of the present disclosure. With reference to FIG. 3, a method for training the user-clicking-item task model in the embodiment may include the following steps:

S301: collecting a plurality of pieces of training data, each piece of the training data including at least two pieces of training feature information of a training user, at least two pieces of training feature information of a training item, and click interaction information of the training user clicking the training item;

A subject for executing the method for training the user-clicking-item task model according to the embodiment is an apparatus for training the user-clicking-item task model. The apparatus may be an electronic entity. Or, the subject may be an application integrated with programs and which, upon use, runs on a mainframe computer device to achieve the training of the user-clicking-item task model by employing the technical solution of the embodiment.

In the embodiment, the number of pieces of the collected training data may reach more than one million. The larger the number of pieces of the collected training data is, the more accurate the trained user-clicking-item task model is.

In the embodiment, reference may be made to the at least two pieces of feature information of the user and the at least two pieces of feature information of the item described with reference to FIG. 1, for the at least two pieces of training feature information of the training user and the at least two pieces of training feature information of the training item included in the collected pieces of training data, which will not be detailed. The click interaction information of the training user clicking the training item may include a case where the user has clicked the training item, or the user has not clicked the training item.

Upon collecting training data in the embodiment, it is possible to track in a web site or application (app) to obtain the user's historical presentation clicks and behavioral data and thereby mine training data.

S302: performing joint training on a recall task module and a click rate estimation task module in the user-clicking-item task model, by using the plurality of pieces of training data.

It is to be noted that before training, it is necessary to randomly initialize parameters of each layer in a network structure in the user-clicking-item task model, and then begin to train the user-clicking-item task model based on the randomly-initialized parameters.

The user-clicking-item task model in the embodiment may employ the structure as shown in FIG. 2. For example, the training may specifically include the following steps:

(a) for each piece of the training data, obtaining a combined feature expression of the training user by splicing the at least two pieces of feature information of the training user after performing embedding expression on them;

(b) obtaining a combined feature expression of the training item by splicing the at least two pieces of training feature information of the training item after performing embedding expression on them;

Since an expression in the form of a vector is obtained by performing embedding expression, the combined feature expression of the training user after the splicing may also be referred to as the combined vector of the training user, and the combined feature expression of the training item after the splicing may also be referred to as the combined vector of the training item.

(c) in the recall task module, obtaining the feature expression of the training user and the feature expression of the training item by processing the combined feature expression of the training user and the combined feature expression of the training item respectively through at least two processing layers including layers for full connection processing and activation processing;

In the embodiment, in the process of generating the feature expression of the training user and the feature expression of the training item, it is needed to go through at least two processing layers including layers for full connection processing and activation processing. The specific number of processing layers may depend from the number of the feature information of the training user. In the case that there is a larger number of feature information of the training user, a larger number of processing layers are needed so as to mix the information more evenly and to obtain more accurate feature expression of the training user. The principle on the side of the feature expression of the training item is similar to that on the side of the feature expression of the training user and will not be detailed. For example, as shown in the network structure of FIG. 2, the processing layer of each layer of the recall task module includes layers for full connection processing+activation processing, and the activation processing may employ ReLU activation processing.

(d) in the recall task module, obtaining a recommendation degree index of the training item to the training user by multiplying the feature expression of the training user with the feature expression of the training item;

In the embodiment, a dot product is obtained by multiplying the feature expression of the training user with the feature expression of the training item. The dot product is used to represent the recommendation degree index of the training item to the training user;

(e) in the click rate estimation task module, obtaining a predicted click probability of the training user clicking the training item by processing in turn through at least two processing layers including layers for full connection processing and activation processing and through a sigmoid activation function processing layer, after splicing the combined feature expression of the training user and the combined feature expression of the training item;

Likewise, in the click rate estimation task module, if there is a larger number of the feature information of the training user and feature information of the training item, a larger number of processing layers may be set to more evenly mix the feature information, obtain more accurate feature information and improve the value of the predicted click probability of the training user clicking the training item. Likewise, in the network structure shown in FIG. 2, the processing layer of each layer of the click rate estimation task module includes layers for full connection processing+activation processing, and the activation processing may also employ ReLU activation processing.

(f) generating a comprehensive cross-entropy loss function according to the recommendation degree index of the training item to the training user, the predicted click probability of the training user clicking the training item, and the known click interaction information of the training user clicking the training item;

For example, the step may specifically include:

(1) generating a first cross-entropy function according to the recommendation degree index of the training item to the training user and the known click interaction information of the training user clicking the training item;

(2) generating a second cross-entropy function according to the predicted click probability of the training user clicking the training item and the known click interaction information of the training user clicking the training item; and (3) summating the first cross-entropy function and second cross-entropy function to obtain the comprehensive cross-entropy function.

For example, the comprehensive cross-entropy function of the embodiment may be expressed by the following equation:

$$\text{loss} = \text{CrossEntropy}(y_{recall}, \hat{y}_{recall}) + \text{CrossEntropy}(y_{ctr}, \hat{y}_{ctr})$$

where $\text{CrossEntropy}(y_{recall}, \hat{y}_{recall})$ represents the first cross-entropy function, and $y_{recall}$ is the known recommendation degree index of the training item to the training user obtained based on the known click interaction information of the training user clicking the training item in the recall task. For example, if the training user has an actual behavior of clicking the training item, $y_{recall}$ is marked as 1; if the training user does not have an actual behavior of clicking the training item, $y_{recall}$ is marked as 0. $\hat{y}_{recall}$ represents the recommendation degree index of the training item to the training user.

$\text{CrossEntropy}(y_{ctr}, \hat{y}_{ctr})$ represents the second cross-entropy function, and $y_{ctr}$ is a real click rate of the training user clicking the training item based on the known click interaction information of the training user clicking the training item in the click rate estimation task, and is 1 if the click occurs, and 0 if the click does not occur. $\hat{y}_{ctr}$ is the click rate predicted by the model.

(g) judging whether the comprehensive cross-entropy loss function converges; performing step (h) in response to determining that the function does not converge; and performing step (i) in response to determining that the function converges;

(h) adjusting parameters of the user-clicking-item task model; returning to step (a) to continue training with next piece of training data.

The adjusting may specifically include adjusting parameters of the network structure in the embedding processing module, the recall task module and the click rate estimation task module.

(i) judging whether the comprehensive cross-entropy function converges in all of first continuous preset rounds of training; performing step (j) if YES; if NO, returning to step (a) to continue training with next piece of training data.

(j) determining the parameters of the user-clicking-item task model, and thereby determining the user-clicking-item task model.

Further optionally, when it is determined that the comprehensive cross-entropy function converges in all of first continuous preset rounds of training in step (i), the method may further include: continuing to train the call task module with a plurality of pieces of training data until the first cross-entropy function converges in all of second continuous preset rounds of training, determining parameters of the recall task module, determining the recall task module and thereby determining the user-clicking-item task model.

That is to say, since the click rate estimation task module in the user-clicking-item task model in the embodiment is only used to introduce interaction of the feature expression of the user and the feature expression of the item in the model training process, when training is performed again, the click rate estimation task module, by back-propagation, may affect embedding parameters in the embedding processing module so that information of interaction between the feature expression of the user and the feature expression of the item is recorded in the embedding parameters, and thereby may affect the recall task so that the recall effect is made better. Furthermore, in order to further improve the recall effect, by optimizing the parameters of the network structure in the recall task module, after the training is performed until the comprehensive cross-entropy function converges in the embodiment, it is further possible to further adjust the parameters of the network structure in the recall task module so that the first cross-entropy function converges in all of the second continuous preset rounds of training, thereby determining parameters of the recall task module, determining the recall task module and thereby determining the user-clicking-item task model.

The first continuous preset rounds and second continuous preset rounds in the embodiment may be set to 100, 200 or other values according to actual needs, which will not be limited herein.

The duly-trained user-clicking-item task model employed by the embodiment shown in FIG. 1 is the user-clicking-item task model duly trained by the above training method.

According to the above technical solution of the method of training the user-clicking-item task model in the embodiment, the recall task and the click rate estimation task may be trained simultaneously; it is possible to, upon training, affect embedding parameters in the embedding processing module by back-propagation, so that information of interaction between the feature expression of the user and the feature expression of the item is recorded in the embedding parameters, thereby affect the recall task so that the recall effect is made better. Hence, the user-clicking-item task model trained by the technical solution of the embodiment may effectively improve the recall effect so that when the item is recommended based on the user-clicking-item task model, the recommendation accuracy may be effectively improved and the item-recommending efficiency may be enhanced.

Furthermore, during training according to the embodiment, when it is determined that the comprehensive cross-entropy function converges in all of the first continuous preset rounds of training, it is also possible to continue to train the call task module in the user-clicking-item task model with a plurality of pieces of training data until the first cross-entropy function converges in all of the second continuous preset rounds of training, determine parameters of the recall task module, determine the recall task module and thereby determine the user-clicking-item task model, thereby further improving the recall effect, improving the recommendation accuracy and enhancing the item-recommending efficiency.

Figure 4:
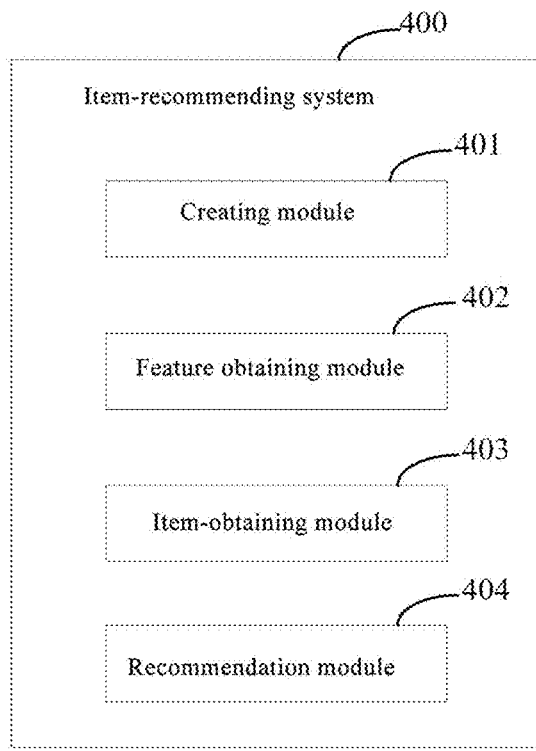
FIG. 4 illustrates a schematic diagram of a third embodiment of the present disclosure.

FIG. 4 illustrates a schematic diagram of a third embodiment of the present disclosure. With reference to FIG. 4, an item-recommending system 400 in the embodiment may specifically include:

a creating module 401 configured to create an item feature expression database using a pre-trained user-clicking-item task model and at least two pieces of feature information of items in a repository of items to be recommended;

a feature obtaining module 402 configured to obtain a feature expression of a user using the pre-trained user-clicking-item task model and the at least two pieces of feature information of the user;

an item-obtaining module 403 configured to obtain identifiers of N items to be recommended according to the feature expressions of the user and the item feature expression database; and a recommendation module 404 configured to recommend relevant information of the N items to the user based on the identifiers of the N items.

Further optionally, in the item-recommending system 400 of the embodiment, the item-obtaining module 403 is configured to:

obtain feature expressions of the N items most relevant to the feature expression of the user by searching from the item feature expression database; and obtain the identifiers of the N items corresponding to the feature expressions of the N items.

Further optionally, in the item-recommending system 400 of the embodiment, the pre-trained user-clicking-item task model includes a recall task module and a click rate estimation task module, and the recall task module and the click rate estimation task module are trained jointly.

The principle of the item-recommending system 400 of the embodiment implementing item recommendation by using the above modules and the resultant technical effect are the same as the implementation of the above method embodiment. Reference may be made to the depictions of the above relevant method embodiments for details, which will not be detailed.

Figure 5:
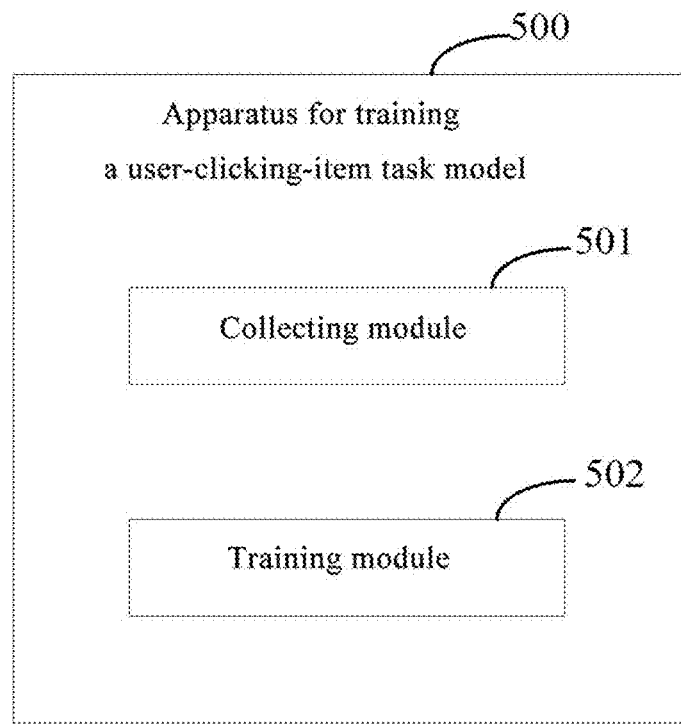
FIG. 5 illustrates a schematic diagram of a fourth embodiment of the present disclosure.

FIG. 5 illustrates a schematic diagram of a fourth embodiment of the present disclosure. As shown in FIG. 5, an apparatus 500 for training a user-clicking-item task model in the embodiment includes:

a collecting module 501 configured to collect a plurality of pieces of training data, each piece of the training data including at least two pieces of training feature information of a training user, at least two pieces of training feature information of a training item, and click interaction information of the training user clicking the training item;

a training module 502 configured to perform joint training on a recall task module and a click rate estimation task module in the user-clicking-item task model, by using the plurality of pieces of training data.

Further optionally, in the apparatus 500 for training the user-clicking-item task model in the embodiment, the training module 502 is specifically configured to:

obtain a combined feature expression of the training user by splicing the at least two pieces of feature information of the training user after performing embedding expression on them;

obtain a combined feature expression of the training item by splicing the at least two pieces of training feature information of the training item after performing embedding expression on them;

in the recall task module, obtain the feature expression of the training user and the feature expression of the training item by processing the combined feature expression of the training user and the combined feature expression of the training item respectively through at least two processing layers including layers for full connection processing and activation processing;

in the recall task module, obtain a recommendation degree index of the training item to the training user by multiplying the feature expression of the training user with the feature expression of the training item;

in the click rate estimation task module, obtain a predicted click probability of the training user clicking the training item by processing in turn through at least two processing layers including layers for full connection processing and activation processing and through a sigmoid activation function processing layer, after splicing the combined feature expression of the training user and the combined feature expression of the training item;

generate a comprehensive cross-entropy loss function according to the recommendation degree index of the training item to the training user, the predicted click probability of the training user clicking the training item, and the known click interaction information of the training user clicking the training item;

judge whether the comprehensive cross-entropy loss function converges; adjust parameters of the user-clicking-item task model in response to determining that the comprehensive cross-entropy loss function does not converge;

in response to determining that the comprehensive cross-entropy loss function converges, and in response to determining that the comprehensive cross-entropy function converges in all of first continuous preset rounds of training, determine parameters of the user-clicking-item task model, and thereby determine the user-clicking-item task model.

Further optionally, in the apparatus 500 for training the user-clicking-item task model in the embodiment, the training module 502 is configured to:

generate a first cross-entropy function according to the recommendation degree index of the training item to the training user and the known click interaction information of the training user clicking the training item;

generate a second cross-entropy function according to the predicted click probability of the training user clicking the training item and the known click interaction information of the training user clicking the training item; and summate the first cross-entropy function and second cross-entropy function to obtain the comprehensive cross-entropy function.

Further optionally, in the apparatus 500 for training the user-clicking-item task model in the embodiment, the training module 502 is further configured to:

in response to determining that the comprehensive cross-entropy function converges in all of the first continuous preset rounds of training, continue to train the call task module with the plurality of pieces of training data until the first cross-entropy function converges in all of second continuous preset rounds of training, determine parameters of the recall task module, determine the recall task module and thereby determine the user-clicking-item task model.

The principle of the apparatus 500 for training the user-clicking-item task model in the embodiment implementing the training of the user-clicking-item task model by using the above modules and the resultant technical effect are the same as the implementation of the above method embodiment. Reference may be made to the depictions of the above relevant method embodiments for details, which will not be detailed.

According to embodiments of the present disclosure, the present disclosure further provides an electronic device and a readable storage medium.

Figure 6:
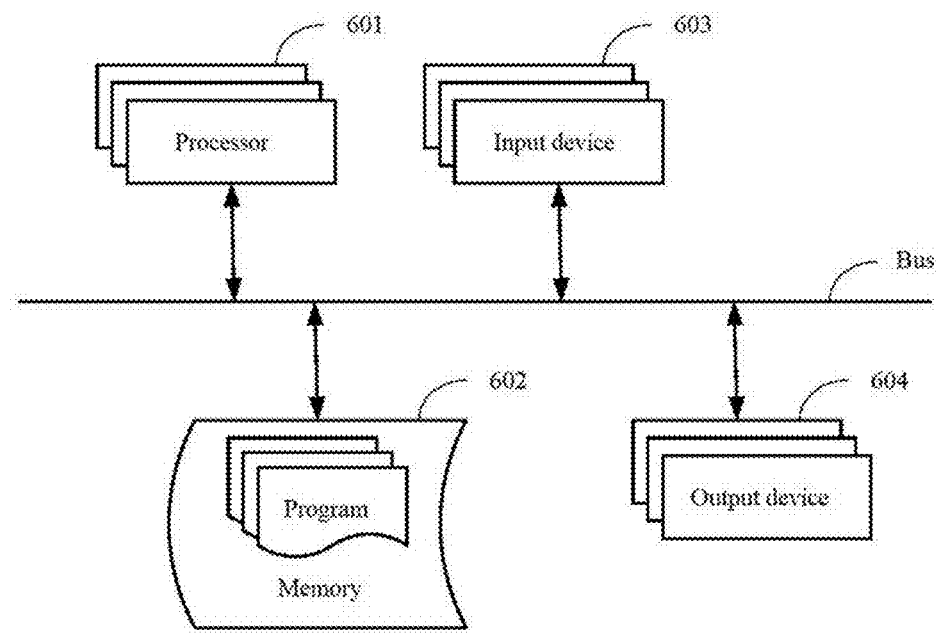
FIG. 6 illustrates a block diagram of an electronic device for implementing the method according to some embodiments of the present disclosure.

As shown in FIG. 6, it shows a block diagram of an electronic device for the method according to some embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 6, the electronic device includes: one or more processors 601, a memory 602, and interfaces configured to connect components and including a high-speed interface and a low speed interface. Each of the components are interconnected using various busses, and may be mounted on a common motherboard or in other manners as appropriate. The processor may process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the item-recommending method or the method for training the user-clicking-item task model provided by the present disclosure. The non-transitory computer-readable storage medium of the present disclosure stores computer instructions, which are used to cause a computer to execute the item-recommending method or the method for training the user-clicking-item task model provided by the present disclosure.

The memory 602 is a non-transitory computer-readable storage medium and may be used to store non-transitory software programs, non-transitory computer executable programs and modules, such as program instructions/modules (e.g., relevant modules shown in FIG. 4 and FIG. 5) corresponding to the item-recommending method or the method for training the user-clicking-item task model in embodiments of the present disclosure. The processor 601 executes various functional applications and data processing of the server, i.e., implements the item-recommending method or the method for training the user-clicking-item task model in the embodiments of the present disclosure, by running the non-transitory software programs, instructions and modules stored in the memory 602.

The memory 602 may include a storage program region and a storage data region, and the storage program region may store an operating system and an application program needed by at least one function; the storage data region may store data created by the use of the electronic device for implementing the item-recommending method or the method for training the user-clicking-item task model. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device for implementing the item-recommending method or the method for training the user-clicking-item task model through a network. Examples of the above network include, but are not limited to, the Internet, an intranet, a local area network, a mobile communication network, and combinations thereof.

The electronic device for implementing the item-recommending method or the method for training the user-clicking-item task model may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device for implementing the item-recommending method or the method for training the user-clicking-item task model, and may be an input device such as a touch screen, keypad, mouse, trackpad, touchpad, pointing stick, one or more mouse buttons, trackball and joystick. The output device 604 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According to the technical solutions of embodiments of the present disclosure, the item feature expression database is created using the pre-trained user-clicking-item task model and at least two pieces of feature information of items in the repository of items to be recommended; the feature expression of a user is obtained using the user-clicking-item task model and at least two pieces of feature information of the user; identifiers of N items to be recommended are obtained according to the feature expression of the user and the item feature expression database; relevant information of the N items is recommended to the user based on the identifiers of the N items. As compared with the prior art, the technical solutions of the embodiments of the present disclosure achieve item recommendation by the pre-trained user-clicking-item task model, may effectively reduce the calculation amount, avoid calculation errors and improve recommendation accuracy. Furthermore, the technical solutions may effectively improve intelligence of item recommendation and enhance item recommendation efficiency.

Furthermore, according to the technical solutions of embodiments of the present disclosure, the recall task model and the click rate estimation task module in the user-clicking-item task model are two independent tasks, and the feature expression of the user may be made interact with the feature expression of the item in the click rate estimation task module. As such, upon training, the click rate estimation task module, by back-propagation, may affect embedding parameters in the embedding processing module so that information of interaction between the feature expression of the user and the feature expression of the item is recorded in the embedding parameters, and thereby may affect the recall task to make the recall effect better and further effectively improve the item recommendation effect.

According to the technical solutions of the embodiments of the present disclosure, in the method of training the user-clicking-item task model, the recall task and the click rate estimation task may be trained simultaneously; it is possible to, upon training, affect embedding parameters in the embedding processing module by back-propagation, so that information of interaction between the feature expression of the user and the feature expression of the item is recorded in the embedding parameters, and thereby affect the recall task so that the recall effect is made better. Hence, the user-clicking-item task model trained by the technical solutions of the embodiments of the present disclosure may effectively improve the recall effect so that when the item is recommended based on the user-clicking-item task model, the recommendation accuracy may be effectively improved and the item-recommending efficiency may be enhanced.

Furthermore, according to the technical solutions of the embodiments of the present disclosure, when it is determined that the comprehensive cross-entropy function converges in all of the first continuous preset rounds of training, it is also possible to continue to train the call task module in the user-clicking-item task model with a plurality of pieces of training data until the first cross-entropy function converges in all of the second continuous preset rounds of training, determine parameters of the recall task module, determine the recall task module and thereby determine the user-clicking-item task model, thereby further improving the recall effect, improving the recommendation accuracy and enhancing the item-recommending efficiency.

It should be understood that the various forms of processes shown above may be used to reorder, add, or delete steps. For example, the steps described in the present disclosure may be performed in parallel, sequentially, or in different orders as long as the desired results of the technical solutions disclosed in the present disclosure may be achieved, which is not limited herein.

The foregoing specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for training a user-clicking-item task model, comprising:
    collecting a plurality of pieces of training data, each piece of the training data including at least two pieces of training feature information of a training user, at least two pieces of training feature information of a training item, and click interaction information of the training user clicking the training item; and
    performing joint training on an embedding processing module, a recall task module and a click rate estimation task module in the user-clicking-item task model, by using the plurality of pieces of training data, comprising:
    for each piece of the training data, obtaining a combined feature expression of the training user by splicing the at least two pieces of feature information of the training user after performing embedding expression on them by the embedding processing module;
    obtaining a combined feature expression of the training item by splicing the at least two pieces of training feature information of the training item after performing embedding expression on them by the embedding processing module;
    in the recall task module, obtaining the feature expression of the training user and the feature expression of the training item by processing the combined feature expression of the training user and the combined feature expression of the training item respectively through at least two processing layers including layers for full connection processing and activation processing;
    in the recall task module, obtaining a recommendation degree index of the training item to the training user by multiplying the feature expression of the training user with the feature expression of the training item;
    in the click rate estimation task module, obtaining a predicted click probability of the training user clicking the training item by processing in turn through at least two processing layers including layers for full connection processing and activation processing and through a sigmoid activation function processing layer, after splicing the combined feature expression of the training user and the combined feature expression of the training item;
    generating a comprehensive cross-entropy loss function according to the recommendation degree index of the training item to the training user, the predicted click probability of the training user clicking the training item, and the known click interaction information of the training user clicking the training item;
    judging whether the comprehensive cross-entropy loss function converges; adjusting parameters of the embedding processing module, the recall task module and the click rate estimation task module in the user-clicking-item task model in response to determining that the comprehensive cross-entropy loss function does not converge, so that embedding parameters in the embedding processing module are affected through back-propagation and information of interaction between the feature expression of the training user and the feature expression of the training item is recorded in the embedding parameters; and
    in response to determining that the comprehensive cross-entropy loss function converges, and in response to determining that the comprehensive cross-entropy function converges in all of first continuous preset rounds of training, determining parameters of the user-clicking-item task model, and thereby determining the user-clicking-item task model.

2. The method according to claim 1, wherein the generating a comprehensive cross-entropy loss function according to the recommendation degree index of the training item to the training user, the predicted click probability of the training user clicking the training item, and the known click interaction information of the training user clicking the training item comprises:
    generating a first cross-entropy function according to the recommendation degree index of the training item to the training user and the known click interaction information of the training user clicking the training item;
    generating a second cross-entropy function according to the predicted click probability of the training user clicking the training item and the known click interaction information of the training user clicking the training item; and summating the first cross-entropy function and second cross-entropy function to obtain the comprehensive cross-entropy function.

3. The method according to claim 2, wherein in response to determining that the comprehensive cross-entropy function converges in all of the first continuous preset rounds of training, the method further comprises:

continuing to train the recall task module with the plurality of pieces of training data until the first cross-entropy function converges in all of second continuous preset rounds of training, determining parameters of the recall task module, determining the recall task module and thereby determining the user-clicking-item task model.

4. An item-recommending method, comprising:

creating an item feature expression database using a user-clicking-item task model and at least two pieces of feature information of an item in a repository of items to be recommended;

obtaining a feature expression of a user using the user-clicking-item task model and at least two pieces of feature information of the user;

obtaining identifiers of N items to be recommended according to the feature expression of the user and the item feature expression database; and recommending relevant information of the N items to the user based on the identifiers of the N items, wherein the user-clicking-item task model is trained with the method according to claim 1.

5. The method according to claim 4, wherein the obtaining identifiers of N items to be recommended according to the feature expression of the user and the item feature expression database comprises:

obtaining feature expressions of the N items most relevant to the feature expression of the user by searching from the item feature expression database; and obtaining the identifiers of the N items corresponding to the feature expressions of the N items.

6. An electronic device, comprising:

at least one processor; and a memory communicatively connected with the at least one processor; wherein, the memory stores instructions executable by the at least one processor, and the instructions are executed by the at least one processor to enable the at least one processor to perform an item-recommending method, which comprises:

creating an item feature expression database using a user-clicking-item task model and at least two pieces of feature information of an item in a repository of items to be recommended;

obtaining a feature expression of a user using the user-clicking-item task model and at least two pieces of feature information of the user;

obtaining identifiers of N items to be recommended according to the feature expression of the user and the item feature expression database; and recommending relevant information of the N items to the user based on the identifiers of the N items, wherein the user-clicking-item task model is trained with the method according to claim 1.

7. The electronic device according to claim 6, wherein the obtaining identifiers of N items to be recommended according to the feature expression of the user and the item feature expression database comprises:

obtaining feature expressions of the N items most relevant to the feature expression of the user by searching from the item feature expression database; and obtaining the identifiers of the N items corresponding to the feature expressions of the N items.

8. A non-transitory computer-readable storage medium comprising instructions, which, when executed by a computer, cause the computer to carry out an item-recommending method, which comprises:

creating an item feature expression database using a user-clicking-item task model and at least two pieces of feature information of an item in a repository of items to be recommended;

obtaining a feature expression of a user using the user-clicking-item task model and at least two pieces of feature information of the user;

obtaining identifiers of N items to be recommended according to the feature expression of the user and the item feature expression database; and recommending relevant information of the N items to the user based on the identifiers of the N items, wherein the user-clicking-item task model is trained with the method according to claim 1.

9. The non-transitory computer-readable storage medium according to claim 8, wherein the obtaining identifiers of N items to be recommended according to the feature expression of the user and the item feature expression database comprises:

obtaining feature expressions of the N items most relevant to the feature expression of the user by searching from the item feature expression database; and obtaining the identifiers of the N items corresponding to the feature expressions of the N items.

10. An electronic device, comprising:

at least one processor; and a memory communicatively connected with the at least one processor; wherein, the memory stores instructions executable by the at least one processor, and the instructions are executed by the at least one processor to enable the at least one processor to perform a method for training a user-clicking-item task model, which comprises:

collecting a plurality of pieces of training data, each piece of the training data including at least two pieces of training feature information of a training user, at least two pieces of training feature information of a training item, and click interaction information of the training user clicking the training item; and performing joint training on an embedding processing module, a recall task module and a click rate estimation task module in the user-clicking-item task model, by using the plurality of pieces of training data, comprising:

for each piece of the training data, obtaining a combined feature expression of the training user by splicing the at least two pieces of feature information of the training user after performing embedding expression on them by the embedding processing module;

obtaining a combined feature expression of the training item by splicing the at least two pieces of training feature information of the training item after performing embedding expression on them by the embedding processing module;

in the recall task module, obtaining the feature expression of the training user and the feature expression of the training item by processing the combined feature expression of the training user and the combined feature expression of the training item respectively through at least two processing layers including layers for full connection processing and activation processing;

in the recall task module, obtaining a recommendation degree index of the training item to the training user by multiplying the feature expression of the training user with the feature expression of the training item;

in the click rate estimation task module, obtaining a predicted click probability of the training user clicking the training item by processing in turn through at least two processing layers including layers for full connection processing and activation processing and through a sigmoid activation function processing layer, after splicing the combined feature expression of the training user and the combined feature expression of the training item;

generating a comprehensive cross-entropy loss function according to the recommendation degree index of the training item to the training user, the predicted click probability of the training user clicking the training item, and the known click interaction information of the training user clicking the training item;

judging whether the comprehensive cross-entropy loss function converges; adjusting parameters of the embedding processing module, the recall task module and the click rate estimation task module in the user-clicking-item task model in response to determining that the comprehensive cross-entropy loss function does not converge, so that embedding parameters in the embedding processing module are affected through back-propagation and information of interaction between the feature expression of the training user and the feature expression of the training item is recorded in the embedding parameters; and in response to determining that the comprehensive cross-entropy loss function converges, and in response to determining that the comprehensive cross-entropy function converges in all of first continuous preset rounds of training, determining parameters of the user-clicking-item task model, and thereby determining the user-clicking-item task model.

11. The electronic device according to claim 10, wherein the generating a comprehensive cross-entropy loss function according to the recommendation degree index of the training item to the training user, the predicted click probability of the training user clicking the training item, and the known click interaction information of the training user clicking the training item comprises:

generating a first cross-entropy function according to the recommendation degree index of the training item to the training user and the known click interaction information of the training user clicking the training item;

generating a second cross-entropy function according to the predicted click probability of the training user clicking the training item and the known click interaction information of the training user clicking the training item; and summating the first cross-entropy function and second cross-entropy function to obtain the comprehensive cross-entropy function.

12. The electronic device according to claim 11, wherein in response to determining that the comprehensive cross-entropy function converges in all of the first continuous preset rounds of training, the method further comprises:

continuing to train the recall task module with the plurality of pieces of training data until the first cross-entropy function converges in all of second continuous preset rounds of training, determining parameters of the recall task module, determining the recall task module and thereby determining the user-clicking-item task model.

13. A non-transitory computer-readable storage medium comprising instructions, which, when executed by a computer, cause the computer to carry out a method for training a user-clicking-item task model, which comprises:

collecting a plurality of pieces of training data, each piece of the training data including at least two pieces of training feature information of a training user, at least two pieces of training feature information of a training item, and click interaction information of the training user clicking the training item; and performing joint training on an embedding processing module, a recall task module and a click rate estimation task module in the user-clicking-item task model, by using the plurality of pieces of training data, comprising:

for each piece of the training data, obtaining a combined feature expression of the training user by splicing the at least two pieces of feature information of the training user after performing embedding expression on them by the embedding processing module;

obtaining a combined feature expression of the training item by splicing the at least two pieces of training feature information of the training item after performing embedding expression on them by the embedding processing module;

in the recall task module, obtaining the feature expression of the training user and the feature expression of the training item by processing the combined feature expression of the training user and the combined feature expression of the training item respectively through at least two processing layers including layers for full connection processing and activation processing;

in the recall task module, obtaining a recommendation degree index of the training item to the training user by multiplying the feature expression of the training user with the feature expression of the training item;

in the click rate estimation task module, obtaining a predicted click probability of the training user clicking the training item by processing in turn through at least two processing layers including layers for full connection processing and activation processing and through a sigmoid activation function processing layer, after splicing the combined feature expression of the training user and the combined feature expression of the training item;

generating a comprehensive cross-entropy loss function according to the recommendation degree index of the training item to the training user, the predicted click probability of the training user clicking the training item, and the known click interaction information of the training user clicking the training item;

judging whether the comprehensive cross-entropy loss function converges; adjusting parameters of the embedding processing module, the recall task module and the click rate estimation task module in the user-clicking-item task model in response to determining that the comprehensive cross-entropy loss function does not converge, so that embedding parameters in the embedding processing module are affected through back-propagation and information of interaction between the feature expression of the training user and the feature expression of the training item is recorded in the embedding parameters; and in response to determining that the comprehensive cross-entropy loss function converges, and in response to determining that the comprehensive cross-entropy function converges in all of first continuous preset rounds of training, determining parameters of the user-clicking-item task model, and thereby determining the user-clicking-item task model.

14. The non-transitory computer-readable storage medium according to claim 13, wherein the generating a comprehensive cross-entropy loss function according to the recommendation degree index of the training item to the training user, the predicted click probability of the training user clicking the training item, and the known click interaction information of the training user clicking the training item comprises:

generating a first cross-entropy function according to the recommendation degree index of the training item to the training user and the known click interaction information of the training user clicking the training item;

generating a second cross-entropy function according to the predicted click probability of the training user clicking the training item and the known click interaction information of the training user clicking the training item; and summating the first cross-entropy function and second cross-entropy function to obtain the comprehensive cross-entropy function, and wherein in response to determining that the comprehensive cross-entropy function converges in all of the first continuous preset rounds of training, the method further comprises:

continuing to train the recall task module with the plurality of pieces of training data until the first cross-entropy function converges in all of second continuous preset rounds of training, determining parameters of the recall task module, determining the recall task module and thereby determining the user-clicking-item task model.

* * * * *